United States Patent
Cheng et al.

(10) Patent No.: US 7,436,128 B2
(45) Date of Patent: Oct. 14, 2008

(54) DRIVING CIRCUIT FOR HOT CATHODE FLUORESCENT LAMPS

(75) Inventors: Ying-Chang Cheng, Taipei Hsien (TW); Chin-Biau Chung, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 24 days.

(21) Appl. No.: 11/584,595

(22) Filed: Oct. 23, 2006

(65) Prior Publication Data

US 2008/0106214 A1    May 8, 2008

(51) Int. Cl.
*H05B 37/02* (2006.01)

(52) U.S. Cl. ............ 315/291; 315/209 R; 315/307

(58) Field of Classification Search ......... 315/209 R, 315/224, 276, 291, 307, 247, 302, DIG. 4
See application file for complete search history.

(56) References Cited

U.S. PATENT DOCUMENTS

| | | | |
|---|---|---|---|
| 5,410,466 A * | 4/1995 | Maehara | 363/98 |
| 5,517,086 A | 5/1996 | El-Hamamsy et al. | 310/701 |
| 5,959,410 A * | 9/1999 | Yamauchi et al. | 315/209 R |
| 6,229,271 B1 * | 5/2001 | Liu | 315/291 |
| 6,297,613 B1 | 10/2001 | Elliott et al. | 310/366 |
| 6,654,268 B2 * | 11/2003 | Choi | 363/134 |
| 6,667,586 B1 | 12/2003 | Blau | 310/366 |
| 6,909,622 B2 | 6/2005 | Weng | 363/126 |
| 6,969,958 B2 * | 11/2005 | Henry | 315/291 |
| 7,061,781 B2 | 6/2006 | Heckmann et al. | 363/81 |

FOREIGN PATENT DOCUMENTS

| | | |
|---|---|---|
| TW | 519854 | 2/2003 |
| TW | M242969 U | 9/2004 |
| TW | M290932 U | 5/2006 |

* cited by examiner

*Primary Examiner*—Douglas W. Owens
*Assistant Examiner*—Jimmy T Vu
(74) *Attorney, Agent, or Firm*—Muncy, Geissler, Olds & Lowe, PLLC

(57) ABSTRACT

A driving circuit for hot cathode fluorescent lamps aims to filter out signals with a voltage value lower than a duty voltage value of a switch unit through a commutation unit and a valley filled power correction circuit to prevent power from accumulating and the switch unit from being pierced.

4 Claims, 8 Drawing Sheets

DRIVING CIRCUIT FOR HOT CATHODE FLUORESCENT LAMPS

FIELD OF THE INVENTION

The present invention relates to a driving circuit and particularly to a driving circuit for hot cathode fluorescent lamps to filter out signals with a voltage value lower than a duty voltage of a switch unit through a commutation unit and a valley filled power factor correction circuit to prevent electricity from piercing the switch unit.

BACKGROUND OF THE INVENTION

The general AC transmitted through the AC distribution system of power companies usually are connected to various types of loads that include resistance loads such as incandescent lamps, ovens and the like, and many other types of loads that mostly consist of resistance and induction. Hence on electronic circuits the current phase angle is lagged behind the voltage. In general the total current provided by the power company from generators through the power transmission and distribution lines includes effective current and ineffective current. Due to different rated voltage of different loads, the electrometer at user ends counts on the effective power (KW). However the ineffective power (KVAR) causes line voltage drops and loss. This is a loss to both the user ends and the power company. Hence to regulate power factor is a big issue for providers of user end systems.

The techniques of power factor regulation can be divided into active type and passive type. They aim to reduce power loss, improve power quality, increase the life span of loads and save power expense. Valley filled power factor regulation circuit is one of the techniques adopted on electronic devices that can set a voltage value to regulate power. For instance R.O.C. patent No. M242969 discloses a driving circuit for electronic stabilizers of low resonant waves that mainly includes a power source input and a commutation circuit which consists of D1, D2, D3 and D4, a transformation circuit (valley filled power factor correction circuit) consisting of C2, D5, D6, R7 and C6 to transform AC to DC at almost same voltage, a driving circuit (push-pull inverter circuit) consisting of two complimentary high voltage transistors (preferably MOSFET) to transform DC to a high frequency square wave, and a voltage division circuit to generate an one half power voltage that has an output end connecting to one end of a lamp. Its features include the driving circuit having a resistor switch R3 to provide a small bias voltage to activate an inductor. The resistor switch is coupled with a capacitor C3 to isolate DC from entering the inductor. The resistor switch further is coupled with DZ1 to limit the bias voltage amplitude of the transistors within the range of 12V. The resistor switch also is connected to a LC resonant circuit consisting of C4 and an inductor to transform oscillating square waves to sinusoidal waves. The resistor switch further is connected to a C1 to improve wave filtering and enhance CF value. The resistor switch also is connected to one C to isolate DC portion so that the load is driven by AC. The resistor switch further is connected to C5 and R4 to improve the surge of the square waves.

Other reference of the valley filled power factor regulation circuit can be found in R.O.C. patent Nos. M290932 and R.O.C. patent publication Nos. 519854, and U.S. Pat. Nos. 7,061,781, 6,909,622, 5,517,086, 6,667,586 and 6,297,613.

The valley filled power factor regulation circuits in the aforesaid techniques mostly have a transistor switch at the rear end to split power signals. The transistor switch in practice has a duty voltage value which is the lowest voltage when the transistor switch is in an operating condition. When an electronic device equipped with a valley filled power factor regulation circuit is in an operating condition, if the signal transmitted to the transistor switch has a voltage value lower than the duty voltage of the transistor, the transistor cannot enter the operating condition due to not sufficient voltage. Then the power of signals transmitted to the transistor switch will accumulate on the input end of the transistor switch. When the accumulated power reaches the limit of the transistor switch, the transistor switch will be damaged or pierced. Hence how to prevent accumulation of low voltage power to damage or pierce the transistor switch is a big issue pending to be resolved in the industry.

SUMMARY OF THE INVENTION

Therefore the primary object of the present invention is to provide a driving circuit for hot cathode fluorescent lamps to prevent a switch unit from being pierced by accumulating power. It filters out input signals that have a voltage value lower than the duty voltage of the switch unit through a cutoff voltage so that the switch unit can get signals that are operable.

To achieve the foregoing object, the driving circuit for hot cathode fluorescent lamps according to the invention mainly includes a commutation unit to transform AC input cycle signals to DC cycle signals, a switch unit to divide driving power output to the hot cathode fluorescent lamps that has a duty voltage value and a valley filled power factor correction circuit which is electrically connected to the commutation unit and has a cutoff voltage value higher than the duty voltage value of the switch unit. Therefore when the voltage of the AC input cycle signals is lower than the cutoff voltage, the commutation unit cuts off conduction. As a result, the AC input cycle signals with the voltage lower than the cutoff voltage are filtered out before arriving the commutation unit. The switch unit at the rear end receives signals that have a voltage higher enough to allow the switch unit to enter an operating condition. Thus power accumulation that might otherwise occur to pierce the switch unit can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
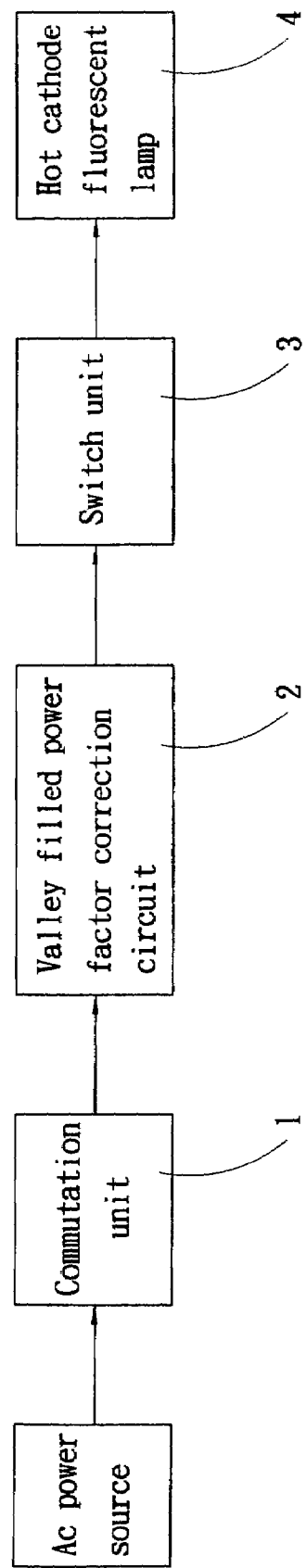
FIG. 1 is a block diagram of an embodiment of the invention.
Figure 2:
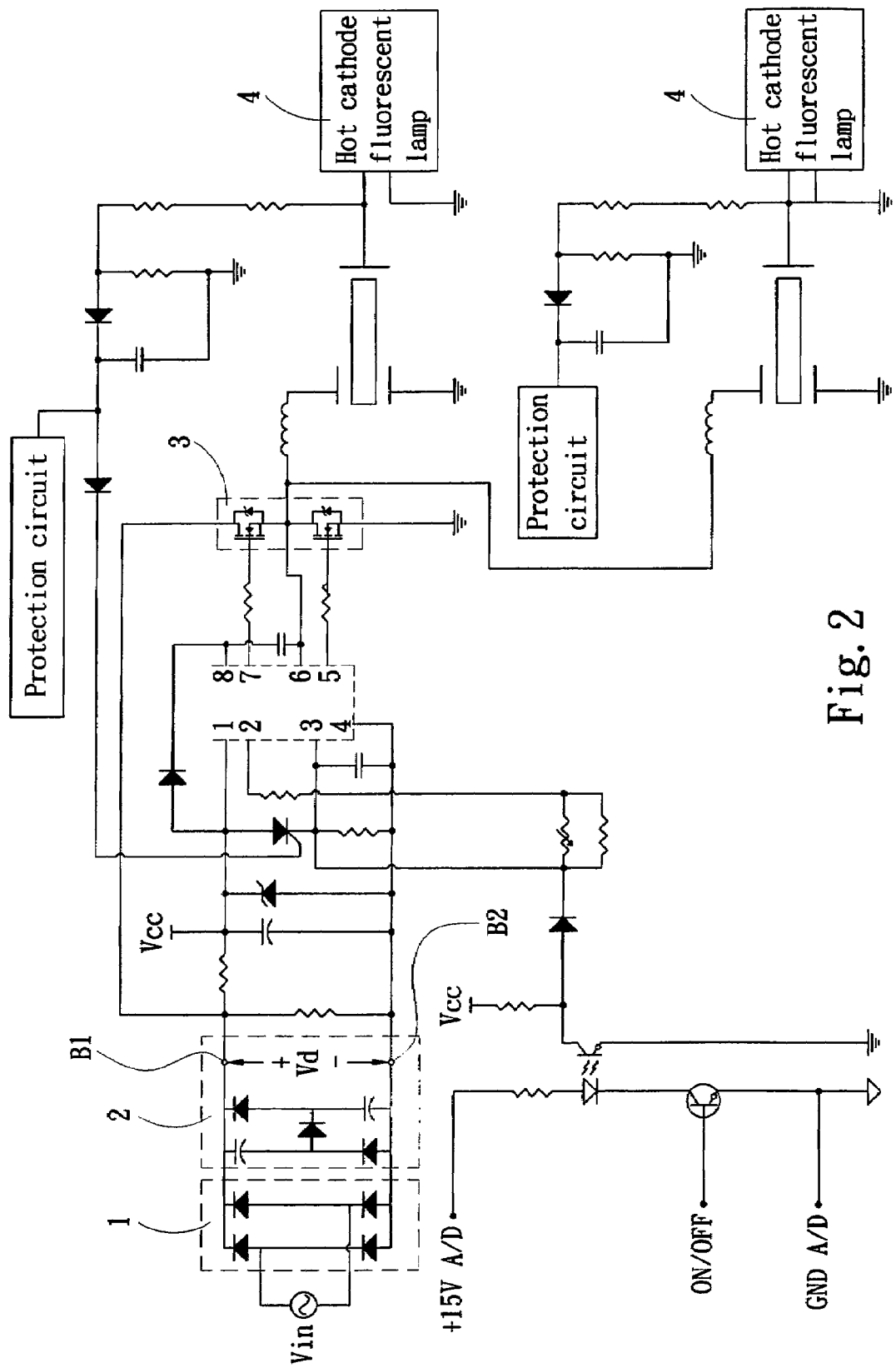
FIG. 2 is a circuit diagram of an embodiment of the invention.
Figure 3A:
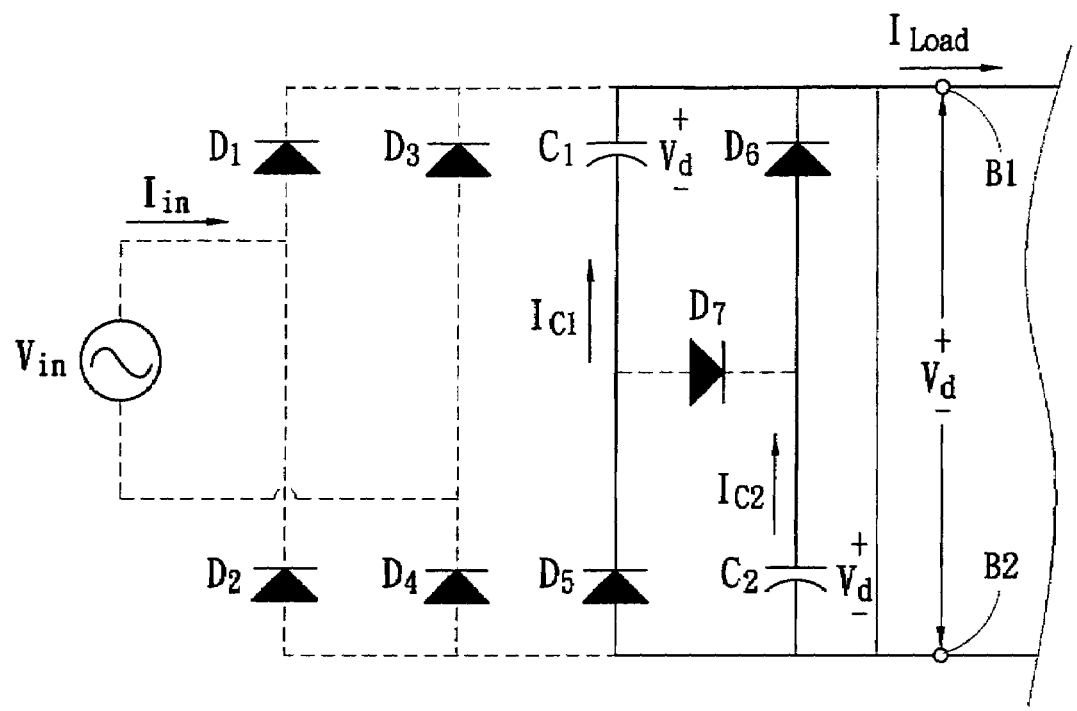
FIG. 3A is an equivalent circuit diagram of duty mode I of a valley filled power factor correction circuit according to an embodiment of the invention.
Figure 3B:
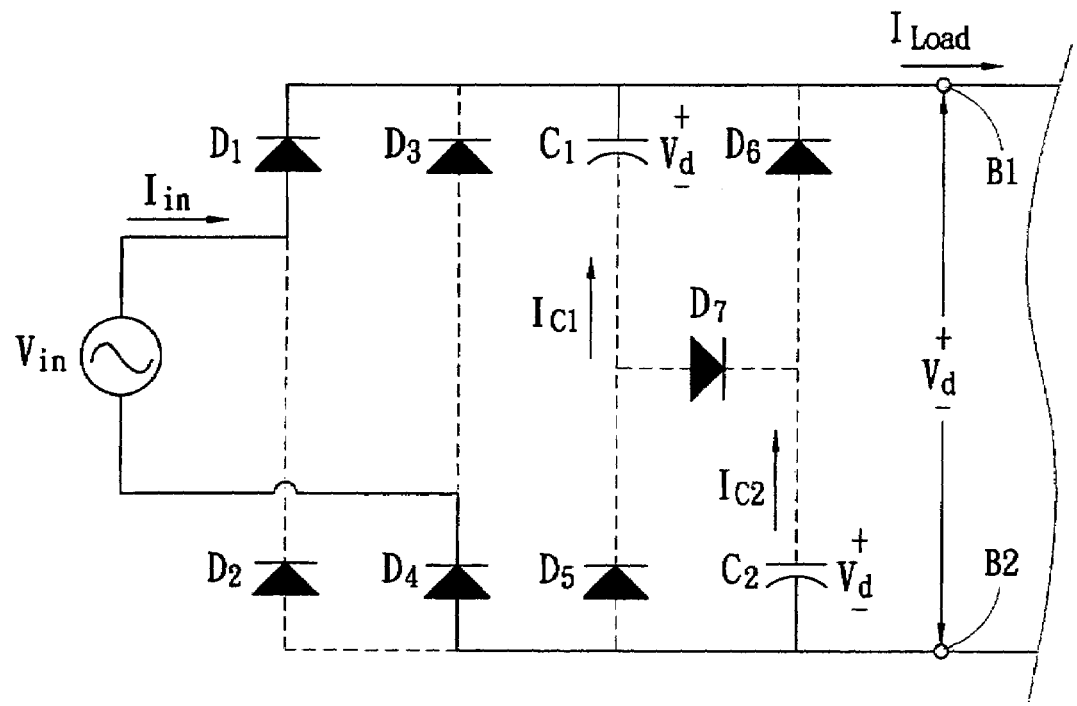
FIG. 3B is an equivalent circuit diagram of duty mode II of a valley filled power factor correction circuit according to an embodiment of the invention.
Figure 3C:
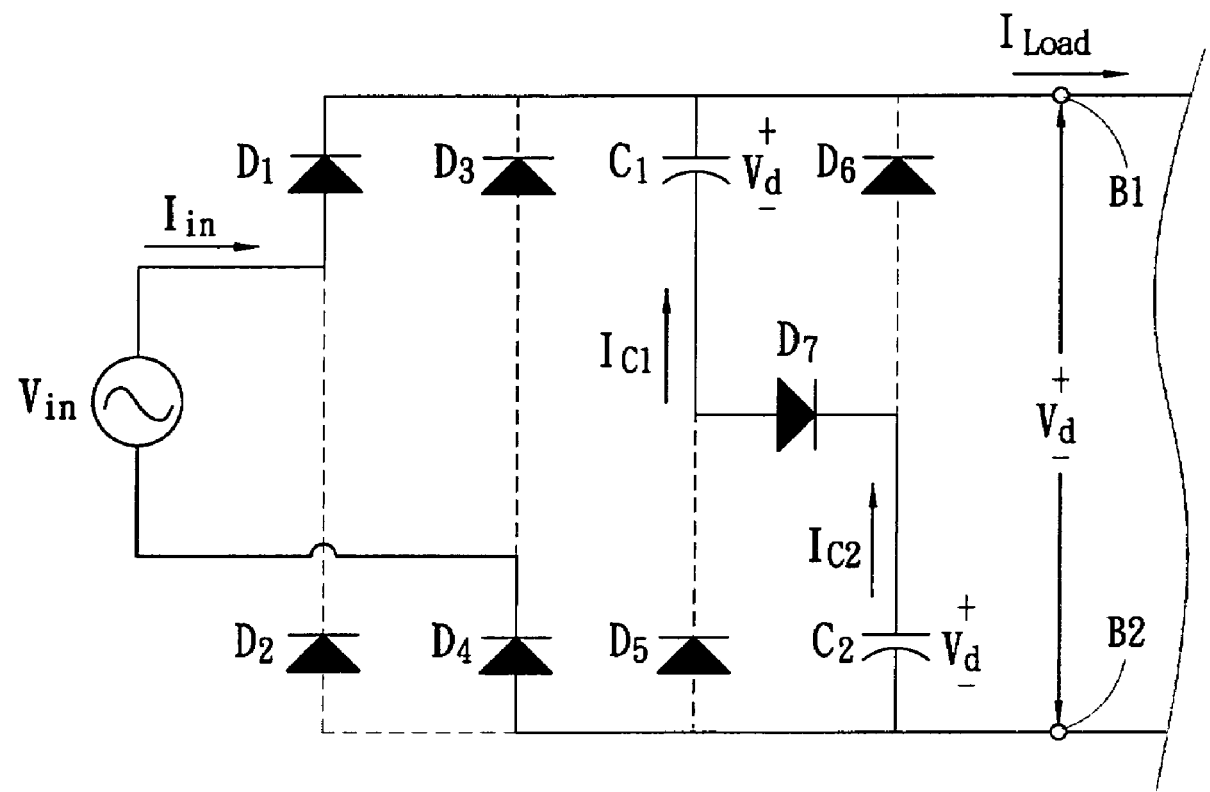
FIG. 3C is an equivalent circuit diagram of duty mode III of a valley filled power factor correction circuit according to an embodiment of the invention.
Figure 4:
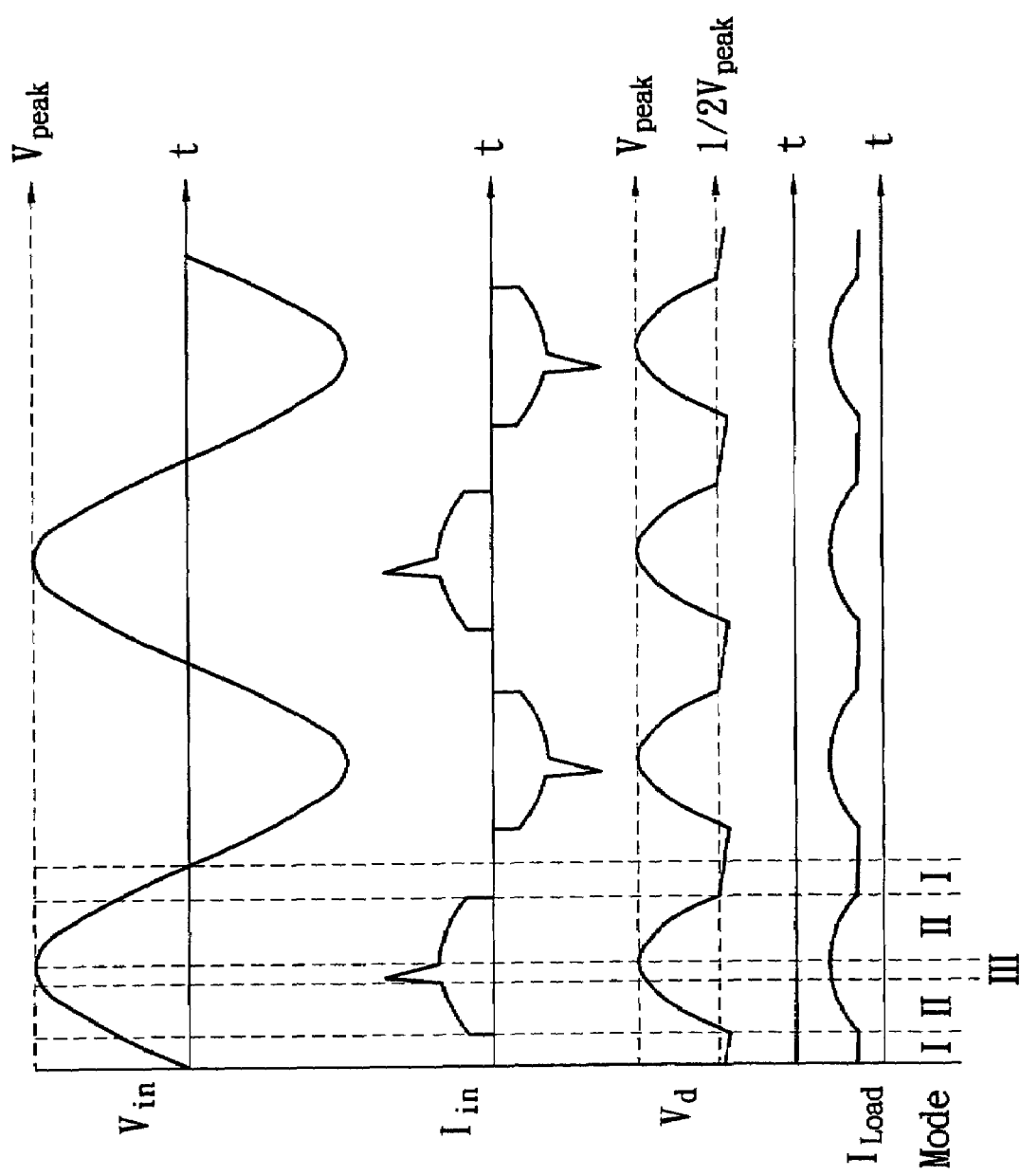
FIG. 4 is a waveform chart of a valley filled power factor correction circuit in an operation mode according to an embodiment of the invention.
Figure 5:
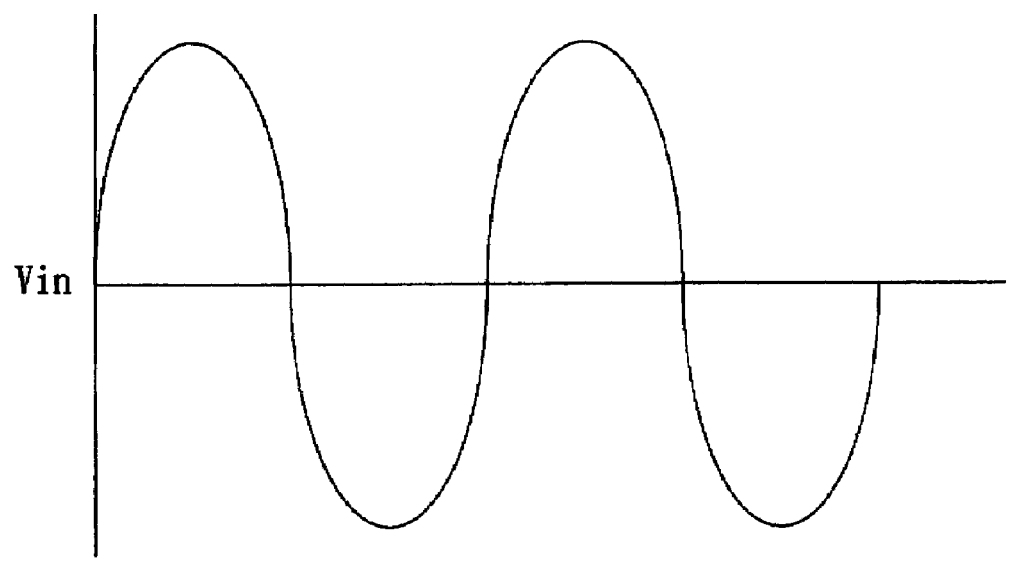
FIG. 5 is a waveform chart of an AC input cycle signal Vin according to an embodiment of the invention.
Figure 6:
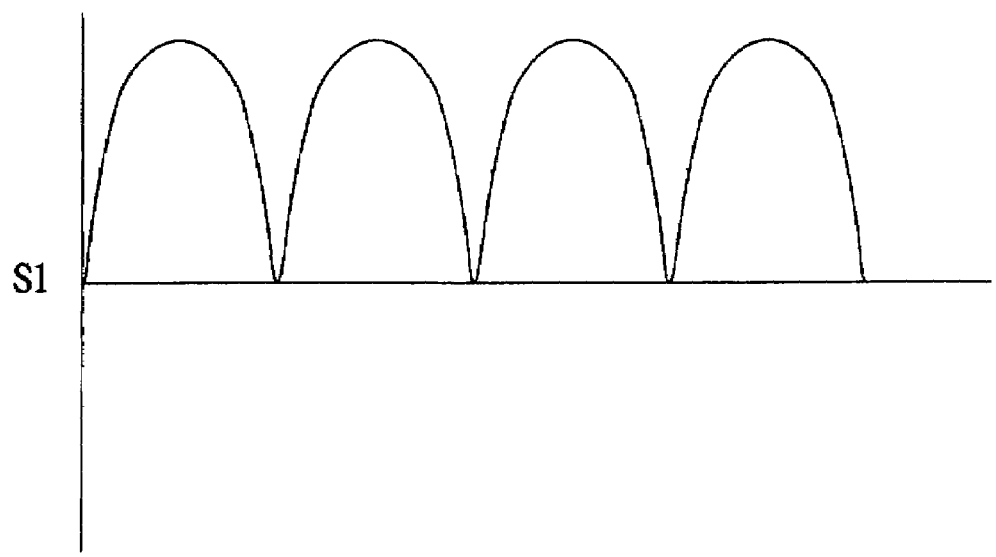
FIG. 6 is a waveform chart of a DC cycle signal S1 according to an embodiment of the invention.

Please refer to FIGS. 1 and 2 for an embodiment of the invention. The driving circuit for a hot cathode fluorescent lamp (HCFL) 4 according to the invention mainly includes:

a commutation unit 1 to transform an AC input cycle signal Vin from an AC power source to a DC cycle signal S1 (also referring to FIGS. 5 and 6). In this embodiment the commutation unit 1 is a full bridge rectifier consisting of D1-D4. It has a first output end B1 and a second output end B2.

Table 1 below shows circuit conditions of a valley filled filter in various duty modes according to an embodiment of the invention.

TABLE 1

| Duty mode | Voltage condition | Diode condition ON | OFF | Current condition |
|---|---|---|---|---|
| I | \|Vin\| < Vcp; Vd = Vcp | D5, D6 | Other | Iin = 0; $I_{Load} = I_{C1} + I_{c2}$ |
| II | Vcp < \|Vin\| < Vcs; Vd = \|Vin\| | D1, D4; Vin > 0 D2, D3; Vin < 0 | Other | Iin = $I_{Load}$; $I_{C1} = I_{c2} = 0$ |
| III | \|Vin\| > Vcs; Vd = \|Vin\| | D1, D4, D7; Vin > 0 D2, D3, D7; Vin < 0 | Other | Iin = $I_{Load} - I_{C1}$; $I_{C1} = I_{c2}$ |

Figure 7:
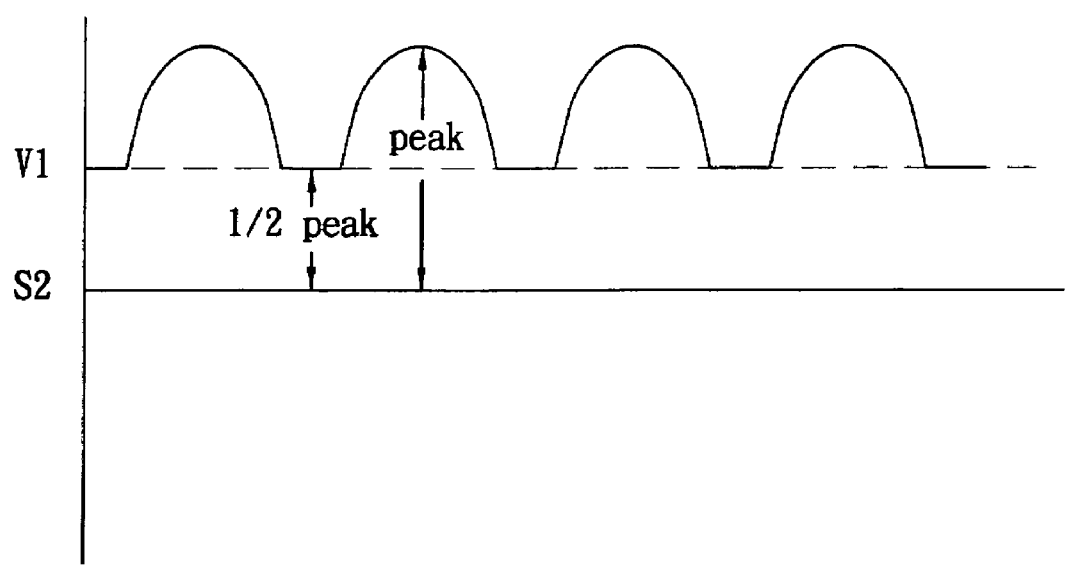
FIG. 7 is a waveform chart of an AC input cycle signal S2 in a filtered condition according to an embodiment of the invention.

The invention further includes a valley filled power factor correction circuit 2 to receive the DC cycle signal from the commutation unit 1, and has a cutoff voltage value V1. When the voltage value of the AC input cycle signal Vin is lower than the cutoff voltage V1 the commutation unit 1 cuts off conduction. When the voltage value of the AC input cycle signal Vin is higher than or equal to the cutoff voltage V1 conduction is established to form a filter wave condition S2 (referring to FIG. 7). In this embodiment the valley filled power factor correction circuit 2 includes a first circuit (not shown in the drawings) consisting of a first capacitor C1 and a first diode D5, and a second circuit (also not shown in the drawings) consisting of a second capacitor C2 and a second diode D7. The second diode D7 is located between the first circuit and the second circuit. The first circuit and the second circuit are located between the first output end B1 and the second output end B2. The valley filled power factor correction circuit 2 has three duty modes I, II and III (referring to FIGS. 3A, 3B, 3C, 4 and table 1). It is based on a principle that the capacitors C1 and C2 have a charging path and a discharging path that are different. Hence the conduction time period of the commutation unit 1 increases. Therefore power factor can be boosted up to 0.95. Moreover, the cutoff voltage value V1 is ½ peak value of the AC input cycle signal Vin received by the commutation unit 1.

Figure 8:
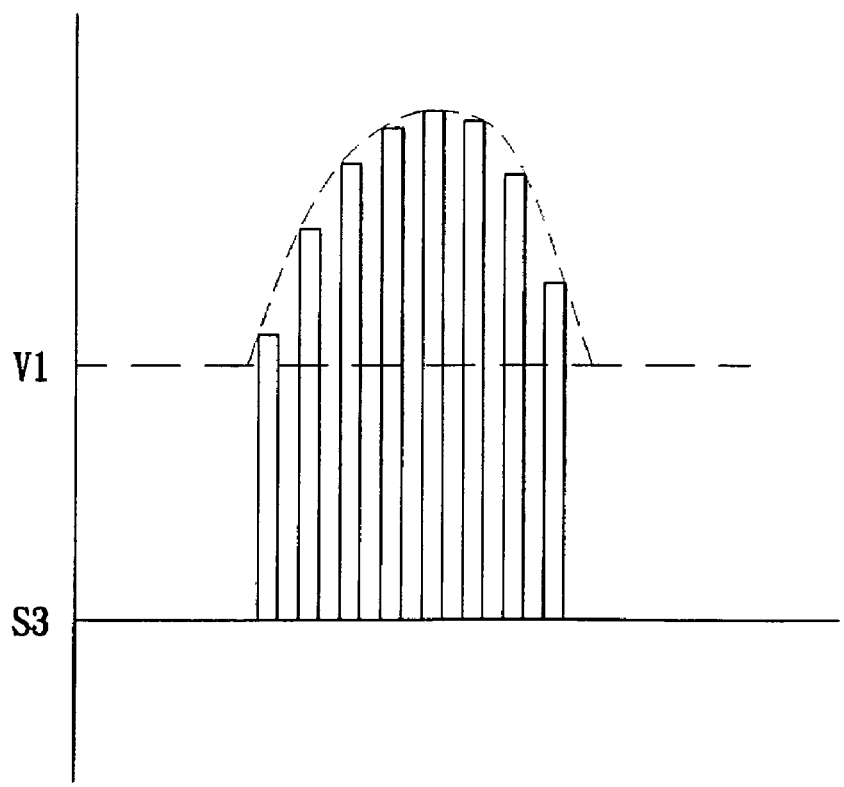
FIG. 8 is a waveform chart of a driving signal S3 according to an embodiment of the invention.
Figure 9:
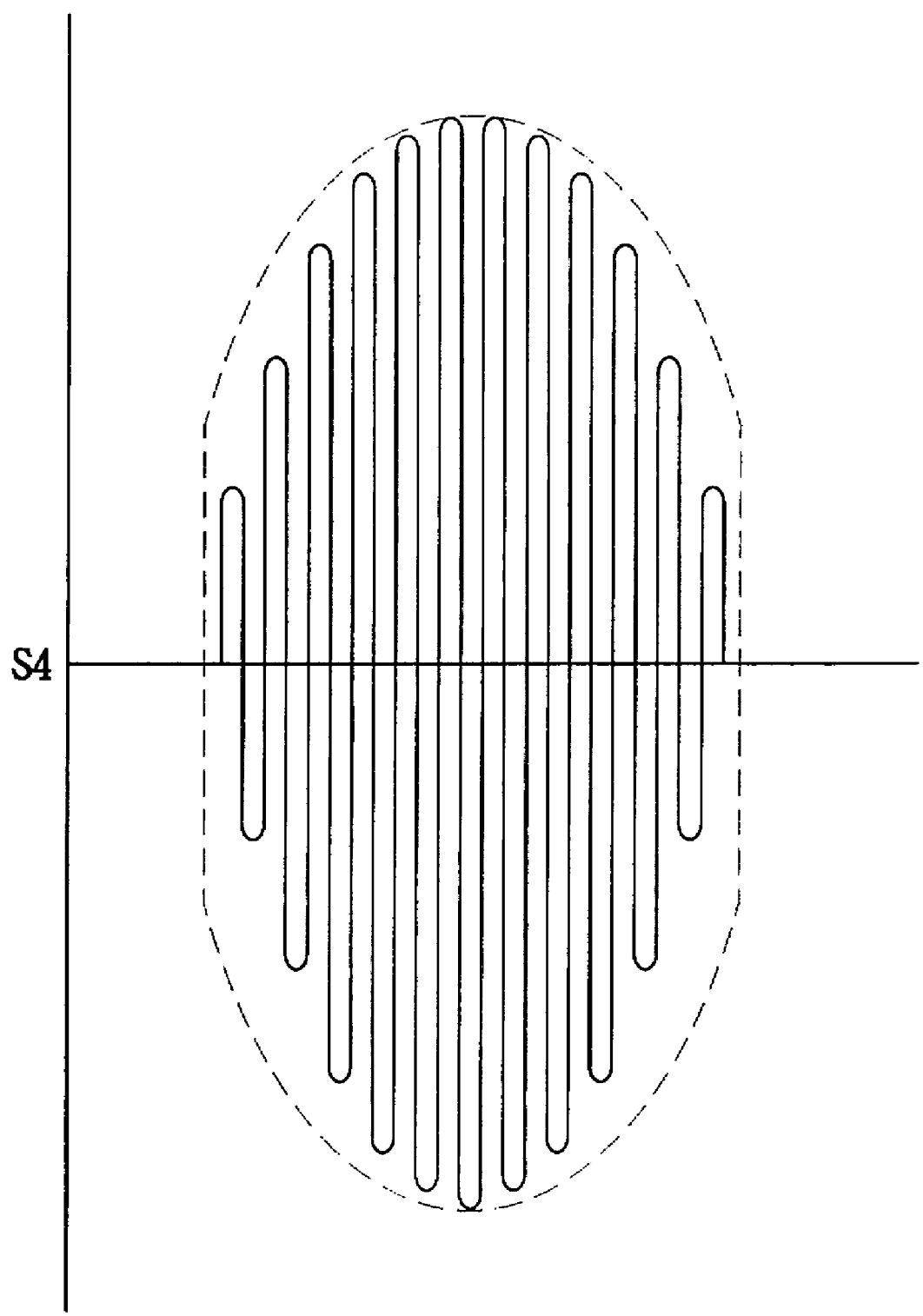
FIG. 9 is a waveform chart of an AC sinusoidal signal S4 according to an embodiment of the invention.

The invention further includes a switch unit 3 which has a duty voltage and divides the driving power output to the HCFL 4 to output a driving signal S3 (referring to FIG. 8) so that the HCFL 4 receives the power of an AC sinusoidal signal S4 (referring to FIG. 9) to generate light. The duty voltage is a minimum voltage of the power required by the switch unit 3 to enter an operating condition. The ½ peak value voltage is greater than the duty voltage. Hence through the valley filled power factor correction circuit 2 the AC input cycle signal lower than the cutoff voltage value V1 can be filtered out before reaching the commutation unit 1. And the voltage received by the rear end switch unit 3 is sufficient to enable the switch unit 3 to enter the operating condition. Thereby power accumulation that might otherwise happen on the input end of the switch unit 3 can be prevented and piercing of the switch unit 3 can be avoided. In this embodiment the switch unit 3 is two transistors.

In short, the invention can filter out a portion of AC input cycle signal Vin that has a voltage value lower than the duty voltage through the commutation unit 1 and the valley filled power factor correction circuit 2 to prevent the voltage of input signals of the switch unit 3 lower than the duty voltage. Thus accumulation of power on the input end of the switch unit 3 can be prevented and piercing of the switch unit 3 can be avoided. It provides a significant improvement over the conventional techniques.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A driving circuit for a hot cathode fluorescent lamp (HCFL), comprising:
   a commutation unit to transform AC input cycle signals to DC cycle signals;
   a switch unit which divides driving power output to the HCFL and has a duty voltage value; and
   a valley filled power factor correction circuit which is electrically connected to the commutation unit and has a cutoff voltage value which is higher than the duty voltage value of the switch unit such that the commutation unit cuts off conduction when the voltage value of the AC input cycle signals is lower than the cutoff voltage value to prevent power from accumulating on an input end of the switch unit and damage or piercing of the switch unit;
   wherein the commutation unit has a first output end and a second output end, the valley filled power factor correction circuit has a first circuit and a second circuit that consist of a capacitor and a diode and are located between the first output end and the second output end, and a diode located between the first circuit and the second circuit.

2. The driving circuit of claim 1, wherein the cutoff voltage value is ½ peak value of the AC input cycle signals received by the commutation unit.

3. The driving circuit of claim 1, wherein the commutation unit is a full bridge rectifier.

4. The driving circuit of claim 1, wherein the switch unit is a transistor.

* * * * *